July 7, 1925.
C. P. TRIMBLE
CUSHION SEAT AND THE LIKE
Filed Nov. 24, 1923
1,544,872
2 Sheets-Sheet 1
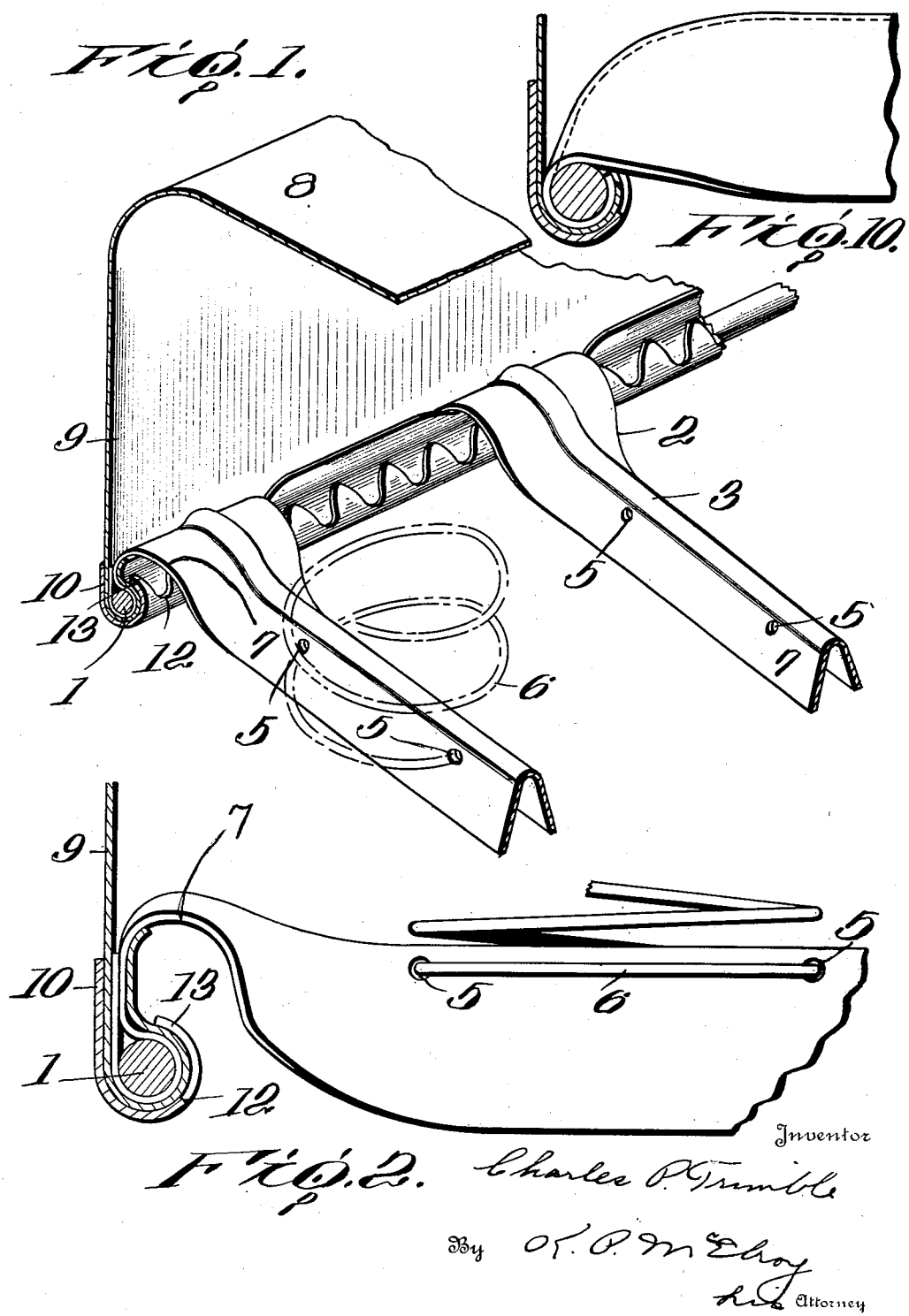

July 7, 1925.

C. P. TRIMBLE

CUSHION SEAT AND THE LIKE

Filed Nov. 24, 1923    2 Sheets-Sheet 2

Inventor
Charles P. Trimble
By A. P. McElroy
His Attorney

Patented July 7, 1925.

1,544,872

UNITED STATES PATENT OFFICE.

CHARLES P. TRIMBLE, OF PITTSBURGH, PENNSYLVANIA, ASSIGNOR TO FORT PITT BEDDING COMPANY, OF PITTSBURGH, PENNSYLVANIA, A CORPORATION OF PENNSYLVANIA.

CUSHION SEAT AND THE LIKE.

Application filed November 24, 1923. Serial No. 676,717.

*To all whom it may concern:*

Be it known that I, CHARLES P. TRIMBLE, a citizen of the United States, residing at Pittsburgh, in the county of Allegheny and State of Pennsylvania, have invented certain new and useful Improvements in Cushion Seats and the like, of which the following is a specification.

This invention relates to cushion seats and the like and it comprises a cushion seat having a lower border frame of wire or similar material, spring supporting slats securely attached to opposite sides of the lower border frame, a covering for the cushion, and clamps arranged for holding the covering in place on the lower border frame, such clamp being substantially U-shaped in cross section and provided on one side with a plurality of tongues and on the other side with a plurality of indentations forming inwardly projecting protuberances arranged to cooperate with the tongues to hold the fabric on the lower border frame.

Cushions for automobiles are subjected to unusually severe strains not only due to the weight of the persons sitting upon them, but to the multitude of vibrations in every direction occasioned by the travel of the automobile. It is a desideratum in this art to provide light cushion seats which are rigid, strong, and simple in construction.

It is an object of the present invention to provide such a seat and especially to provide means for attaching the cushion covering to the lower border frame so there will be no metal projections and the like engaging the covering at points where the strains occur.

In the accompanying drawings in which similar reference numerals designate corresponding parts, I have shown several forms of a specific embodiment of my invention.

In the drawings, Fig. 1 is a perspective taken from the under side of the cushion showing one coil spring in dotted lines;

Fig. 2 is an end view of Fig. 1;

Fig. 10 is a view similar to Fig. 2 showing a different form of spring supporting slat.

Figure 3:
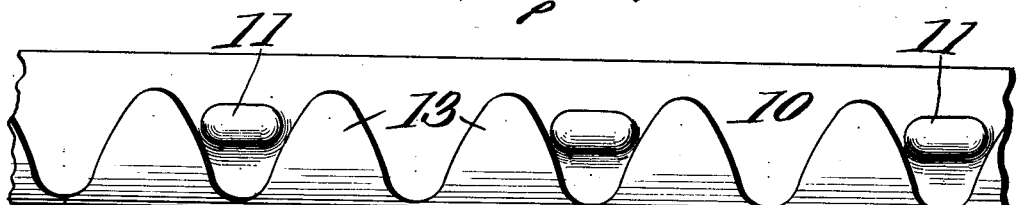
Fig. 3 is a side elevation of one form of clamping device or clip.

Referring to the drawings reference numeral 1 indicates the lower border frame of heavy wire or the like and 2 indicates the transverse spring supporting slat reinforced at 3 throughout its length and provided with a plurality of spaced holes 5 for reception of the lowermost coil of the coil spring 6. The extreme ends of these slats may be offset as at 7 to provide space for a tool for clamping the slat around the lower border frame. These slats are advantageously clamped around the frame through means of their extreme ends which are bent first under the wire frame and then wrapped therearound on the outside. In Fig. 10 the slat is not provided with an offset portion and the end is wrapped around from the front of the wire of the border frame. The cushion cover 8 is provided with a skirt 9 which is wrapped around the outside of the border wire inwardly and which overlaps the extreme ends of the spring supporting slats. The skirting is held in position by means of special clamps to be described.

In Fig. 3 I have shown one form of clamp in which the side 10 is provided with a plurality of spaced inwardly extending projections 11 and in which the side 12 is provided with tongues or tangs 13 leaving spaces between so that the side walls of the tongues 13 engage the fabric and press it against the inside of the wall 10. The inwardly extending projections 11 are of a size to substantially fit the space between the tangs or tongues 13 so that there results a shoulder against which the fabric is pressed.

Figure 4:
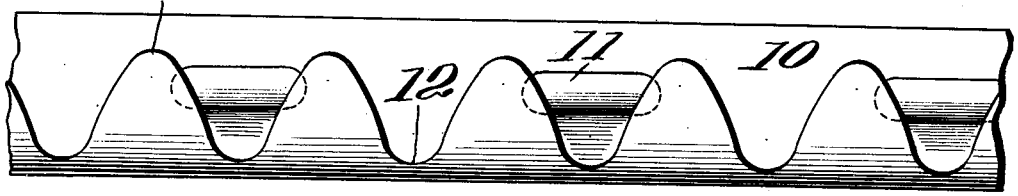
Fig. 4 is a similar view of a modification.
Figure 5:
Fig. 5 is a section through the bottom border frame showing the skirting of the cushion in position when such a clip as that of Fig. 3 is used.
Figure 6:
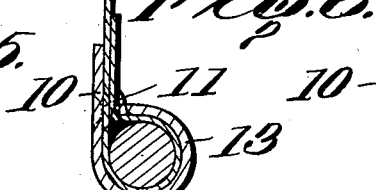
Fig. 6 is a similar section when such a clip as that of Fig. 4 is used.
Figure 7:
Fig. 7 is a section when such a clip as that of Fig. 8 is used.
Figure 8:
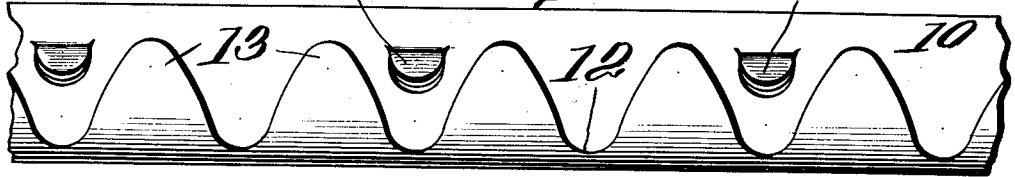
Fig. 8 is a side elevation of another modification of the clamping device or clip.
Figure 9:
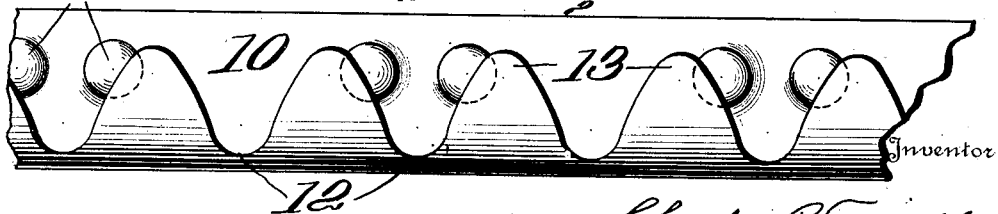
Fig. 9 is still another modification.

In the form shown in Fig. 4 the protuberances 11 are longer than the space between the tangs 13 so the tangs can be bent over the extreme ends of the protuberances and hold the fabric in place. In the form shown in Fig. 8 the protuberances may be pressed entirely out of the side wall 10. These protuberances are here designated as 14. In the form shown in Fig. 9 the side wall 10 of the clamp or clip is provided with a plurality of protuberances 15 against which the tangs or tongues may press the fabric.

The clamp or clip is forced around the lower border frame and the tongues or tangs are clamped into position to hold the fabric while the outer side 10 of the clamps are in vertical position in line with the skirting 9. The result is that the fabric is held in place against longitudinal slipping on the border frame, against any wrinkling or crimping and at the same time the skirting 9 is protected against abrasion. The clips extend on the inside of the offset portion 9 of the transverse bars or slats, this being possible because the extreme ends of these slats are wrapped aroung the lower border frame from the inside outwardly.

What I claim is:

1. In a cushion seat, a lower border frame, transverse bars secured at the ends thereto, the ends of the transverse bars being wrapped around the lower border frame from the inside thereof around the outside, a cover for the cushion having a skirt, and clamps holding the skirt around the lower border frame and around the wrapped ends of the transverse bars, said clamps comprising strips formed adjacent one edge thereof with spaced inwardly directed ribs, and along the other edge with tongues adapted to press the skirt against the said inwardly directed ribs.

2. In a cushion seat for automobiles and the like, a lower border frame, a cushion cover having a skirt wrapped therearound and a clamping device for holding the skirt on the border frame, such clamping device having one side provided with a plurality of spaced inwardly extending protuberances and the other side provided with spaced tongues, the said tongues being bent around the skirt on the lower border frame with the edges of the tongues forcing the skirt against the protuberances.

3. In a cushion seat for automobiles and the like, a lower border frame, a cushion cover having a skirt wrapped therearound and a clamping device for holding the skirt on the border frame, such clamping device having one side provided with a plurality of spaced inwardly extending protuberances and the other side provided with spaced tongues, the tongues being bent around the skirt on the lower border frame with the edges of the tongue forcing the skirt against the protuberances and the extreme ends of the tongues being bent toward the wall on which the protuberances are located past the plane of the protuberance.

4. In a cushion seat, a lower border frame, transverse bars secured at the ends thereto, the ends of the transverse bars being wrapped around the lower border frame from the inside thereof around the outside, a cover for the cushion having a skirt, clamps for holding the skirt around the lower border frame, said clamps comprising continuous strips bent around said border frame, a plurality of spaced tongues formed along the inner edges of said continuous strips, the outer egdes of said strips being formed with a plurality of spaced indentations, staggered with relation to said tongues and adapted to press said skirt inwardly at points between said tongues.

5. In a cushion seat a lower border frame, transverse spring supporting bars secured thereto, a cover having a skirt wrapped around the lower border frame and a clamp holding the skirt in position on the lower border frame, such clamp comprising a continuous piece of sheet metal having one side substantially parallel with the skirting on the outside of the cushion and the other side provided with a series of spaced tongues of sufficient length to extend above the longitudinal axis of the border frame, said tongues being bent around the inside of the border frame against the said skirt and holding the same in locking engagement against the border frame.

6. In a cushion seat a lower border frame, transverse spring supporting bars secured thereto, the ends of said bars being bent downwardly in a plane approximately tangential to the outer curved surface of said border frame, then inwardly and upwardly to engage said frame, a cover having a skirt wrapped around the lower border frame, and a clamp holding the skirt in position thereon, such clamp comprising a continuous piece of sheet metal having one side substantially parallel with the skirting on the outside of the cushion to thereby press said skirting against the upturned end portions of said transverse spring supporting bars, and the other side provided with a series of spaced tongues bent around the inside of the border frame against the said skirt and holding the same in locking engagement.

In testimony whereof, I have hereunto affixed my signature.

CHARLES P. TRIMBLE.